United States Patent
Bolshtyansky et al.

(10) Patent No.: US 7,289,735 B2
(45) Date of Patent: Oct. 30, 2007

(54) APPARATUS FOR EMITTING LIGHT WITH CONTROLLABLE DEGREE OF POLARIZATION

(75) Inventors: Maxim Bolshtyansky, East Windsor, NJ (US); Nicholas King, Lawrenceville, NJ (US)

(73) Assignee: JDS Uniphase Corporation, Milpitas, CA (US)

( * ) Notice: Subject to any disclaimer, the term of this patent is extended or adjusted under 35 U.S.C. 154(b) by 167 days.

(21) Appl. No.: 11/098,229

(22) Filed: Apr. 4, 2005

(65) Prior Publication Data

US 2005/0220161 A1 Oct. 6, 2005

Related U.S. Application Data

(60) Provisional application No. 60/559,997, filed on Apr. 5, 2004.

(51) Int. Cl.
*H04J 14/02* (2006.01)
*H01S 3/091* (2006.01)

(52) U.S. Cl. ............................ 398/94; 398/65; 398/92; 372/75

(58) Field of Classification Search .................. 398/65, 398/152, 94, 92; 359/249; 372/75
See application file for complete search history.

(56) References Cited

U.S. PATENT DOCUMENTS

| | | | | |
|---|---|---|---|---|
| 4,214,300 | A * | 7/1980 | Barlow et al. ................ 700/32 |
| 4,488,277 | A * | 12/1984 | McFarlane et al. ...... 369/47.28 |
| 4,995,690 | A * | 2/1991 | Islam ............................. 385/8 |
| 5,257,126 | A * | 10/1993 | Calvani et al. ............. 398/184 |
| 5,329,394 | A * | 7/1994 | Calvani et al. ............. 398/152 |
| 6,456,426 | B1 | 9/2002 | Bolshtyansky et al. ..... 359/344 |
| 6,597,495 | B2 | 7/2003 | Gertsvolf et al. ......... 359/341.3 |
| 6,731,428 | B2 | 5/2004 | Gehlot ....................... 359/359 |
| 6,735,350 | B1 * | 5/2004 | Gauthier ....................... 385/11 |
| 6,850,360 | B1 | 2/2005 | Chen et al. ................. 359/334 |
| 2002/0094158 | A1 | 7/2002 | Evans et al. .................. 385/27 |
| 2002/0097469 | A1 * | 7/2002 | Yee et al. .................... 359/154 |
| 2003/0063833 | A1 * | 4/2003 | Gonthier et al. .............. 385/11 |
| 2003/0086174 | A1 * | 5/2003 | Wakisaka et al. ........... 359/566 |
| 2003/0095745 | A1 | 5/2003 | Gehlot ......................... 385/31 |
| 2004/0184816 | A1 * | 9/2004 | Charlet ....................... 398/152 |

* cited by examiner

*Primary Examiner*—Minsun Oh Harvey
*Assistant Examiner*—Sean Hagan
(74) *Attorney, Agent, or Firm*—Allen, Dyer, Doppelt, Milbrath & Gilchrist, P.A.

(57) ABSTRACT

A laser apparatus is disclosed combining polarized light beams from two optical emitters into a combined beam of light with controllable degree of polarization (DoP). The laser apparatus includes a polarization combiner for combining the polarized beams into the combined beam, an optical tap for separating out a portion of the combined beam, and a photodetector electrically coupled to a laser controller for providing a feedback signal. The controller distinctively modulates the polarized radiation of each of the emitters, detects modulation signals in the photodetector output and adjusts an output power ratio of the optical emitters for maintaining the DoP of the combined beam at a pre-determined level. The invention can be used for minimizing the DoP of pump radiation in Raman and EDFA pump laser modules combining multiple pump laser diodes.

23 Claims, 5 Drawing Sheets

APPARATUS FOR EMITTING LIGHT WITH CONTROLLABLE DEGREE OF POLARIZATION

CROSS-REFERENCE TO RELATED APPLICATIONS

The present invention claims priority from U.S. Provisional Patent Application No. 60/559,997 filed Apr. 5, 2004, entitled "Monitoring and controlling the pump powers for polarization combined pumping", which is incorporated herein by reference for all purposes.

TECHNICAL FIELD

The present invention relates to laser systems and methods for generating optical radiation with a controllable degree of polarization by combining radiation from multiple lasers in one beam of light, and more particularly to pump modules with multiple pump lasers for generating un-polarized pump radiation for use in optical amplifiers.

BACKGROUND OF THE INVENTION

The ability to control polarization properties of optical radiation is of importance for many applications. In particular, pumping of optical amplifiers, such as erbium-doped fiber amplifiers (EDFA) and Raman amplifiers, which are commonly employed in optical communication systems, typically require sources of high-power laser radiation having a very low degree of polarization (DoP).

The DoP of optical radiation is commonly defined as a ratio of the optical power of a prevailing polarization component of the optical radiation to the total optical power thereof, with a DoP equal to zero corresponding to totally non-polarized light. In optical amplifiers, pump radiation having a non-zero DoP induces a polarization dependant gain (PDG), which is generally detrimental to the system performance. For Raman amplifiers, a low PDG can be achieved by using pump laser light with a low degree of polarization. However, high-power laser diodes commonly used for pumping of optical amplifiers emit strongly polarized optical radiation having a high degree of polarization.

A prior art solution to this problem is shown in FIG. 1, wherein orthogonally-polarized light from two pump lasers 120 and 130 is combined into a combined light beam 195 by using a polarization maintaining beam combiner (PBC) 190. If the optical radiation from individual pumps have equal DoPs at the optical input ports 191 and 192 of the PBC 190, and the polarization beam combiner has the same optical loss for radiation from both pump lasers, the combined laser beam 195 outputted from the PBC 190 is substantially depolarized, i.e. has DoP which is a close to zero, when the laser diodes have equal output powers.

In order to maintain equal pump powers from the pump lasers after the PBC 190 and therefore to maintain the DoP of the combined pump beam 195 at a low enough level, two tap couplers 15 are used in the path of radiation from each laser 120 and 130, with a small portion of the pump light being tapped to photodiodes 140 and 180 respectively. Electrical signals from the photodiodes 140, 180 are fed to a pump controller 110, which controls the output pump power from the pump lasers 120 and 130.

However, the "through" paths of the tap couplers 15, i.e. the optical paths from the output of the laser pumps 120 and 130 to the input ports 191 and 192 of the PBC 190 respectively, have to maintain the polarization of the lasers' radiation, to ensure that there is no change of the polarization of the pump radiation at the input PBC ports 191, 192 at different operating conditions. Therefore in the prior art configuration shown in FIG. 1, the taps 140 and 180 have to be preferably polarization maintaining, which are more expensive than conventional, non-polarization maintaining tap couplers.

Moreover, several pump laser pairs are often used in a single Raman pump module, since optical pumping at several pump wavelengths is required for reducing a Raman gain ripple, i.e. for reducing variations of the Raman gain for data channels at different wavelengths. The prior art pump control scheme, shown in FIG. 1, in that case becomes progressively more expensive, as the number of required polarization-maintaining taps and photodetectors increases proportionally with the number of pump lasers in the module.

It is therefore desirable to have a solution wherein the DoP of the combined radiation is controlled using a feedback signal extracted from the combined radiation after the last pump combiner, without tapping off optical power of each individual pump. The present invention provides a method and system of pump control accomplishing this task by employing distinctive pump modulation as pump "markers" that can be identified in the combined radiation and used to control the DoP thereof.

Various Raman pump modulation schemes have been disclosed in the prior art. For example, U.S. Pat. No. 6,597,495 issued to Gertsvolf et al. discloses synchronously modulating Raman pump lasers for suppressing four-wave mixing effects in the transmission fiber. U.S. Pat. No. 6,850,360 issued to Chen et al. discloses Raman pump modulation for fiber span characterization using optical time-domain reflectometry. U.S. Pat. No. 6,456,426 issued to Bolshtyansky et al. discloses Raman pump modulation for reducing cross-pump interactions in the transmission fiber.

U.S. patent application 2003/0095745 by Gehlot discloses low-amplitude RF modulation of the pump radiation for reducing pattern-dependent cross talk between WDM communication channels.

U.S. Pat. No. 6,731,428 issued to Gehlot discloses superimposing unique signature signals onto the RF-modulated Raman pump lasers for monitoring the performance of the fiber Raman amplifier system. The "signature" signals are extracted at the receiver after propagation through an optical fiber link. If a particular signature signal is noticeably weaker than other received signature signals, as evidenced by a low SNR or high BER, this is indicative of a power loss in its associated pump source.

U.S. patent application 2002/0094158 by Evans et al. discloses an optical fiber amplifier comprising at least one Raman pump modulated with an RF signal for pump power monitoring and Raman gain control of the amplifier. The Raman pump receives both a DC electrical input and an AC electrical input, and provides an optical pump power having both a DC optical power component $P_{dc}$ and an AC optical power component $m \cdot \cos(\omega t)$. The optical fiber amplifier system also includes an optical pump power detector coupled to the pump, and at least one controller operatively connected to the pump power detector to determine the DC optical power component of the optical pump power.

The controller disclosed by Evans et al. detects amplitudes of the AC components of the photocurrent and the photocurrent squared at the frequency of pump modulation, which are proportional to $m$ and $P_{dc} \cdot m$ respectively, and feeds them to a divider circuit to obtain a ratio of the detected amplitudes which is proportional to the DC optical power component $P_{dc}$. The controller then adjusts the DC electrical input to the pump based on the DC optical power component to affect the Raman gain of the amplifier $P_{dc}$.

Operation of this controller is described in U.S. patent application 2002/0094158 in reference to a single-pump system; however, it would be difficult to adopt the controller disclosed therein for an amplifier system, wherein pump power of multiple Raman pumps is combined to enable detection of the DC components of each individual pump. Although Gehlot shows embodiments wherein the afore-described controller is employed in multi-pump amplifiers, it is the Applicant's assertion that the controller described by Evans in U.S. patent application 2002/0094158 would provide a control signal proportional to a DC component of the combined radiation, rather than separating it into the DC components of the optical power of individual Raman pumps, wherefrom the combined radiation is formed.

Although the aforementioned inventions disclose various schemes of Raman pump modulation, none of them provide a solution for DoP control of the combined pump radiation.

It is therefore an object of the present invention to provide a pump combining laser system for pumping of optical amplifiers with a combined radiation from two or more pump lasers, wherein a degree of polarization of the combined radiation is maintained at a near-zero level by adjusting individual pump laser powers using a feedback signal extracted from the combined radiation.

It is another object of the present invention to provide a laser apparatus wherein orthogonally-polarized radiation of two distinctively modulated lasers is combined into combined radiation, and wherein the DoP of the combined radiation is controlled by adjusting a power ratio of the individual lasers based on a modulation detected in the combined radiation.

Another object of the present invention is to provide a method for monitoring and controlling the DoP of combined radiation from two laser sources of orthogonally-polarized radiation by adjusting their power ratio while monitoring a modulation signal in the combined radiation.

SUMMARY OF THE INVENTION

In accordance with the invention, a light emitting apparatus is provided for emitting light with a controllable degree of polarization (DoP), the light emitting apparatus comprising: a first optical emitter for emitting a first at least partially polarized light beam having a prevailing polarization component; a second optical emitter for emitting a second at least partially polarized light beam having a prevailing polarization component; beam combining means for combining the first and second light beams into a combined beam of light wherein the prevailing polarization components of the first and second beams of light are mutually orthogonal; and, optical emitter and DoP control means comprising: i) modulating means for modulating output powers of the first and second optical emitters with first and second distinct modulating signals, respectively; ii) detecting means disposed to receive at least a portion of the combined beam of light for detecting a modulation component thereof related to the first and second distinct modulating signals; and, iii) control circuitry coupled to the detecting means for controlling an average output power of at least one of the first and second emitters in response to the detected modulation component of the combined beam of light, wherein the optical emitter and DoP control means are for controlling the DOP of the combined beam of light by affecting an output power ratio of the first and second emitters in dependence on the detected modulation component of the combined beam of light.

According to the invention, the detecting means comprise: an optical tap for separating out a portion of the combined beam of light, a photodetector optically coupled to the optical tap for converting the portion of the combined beam of light into an electrical output, and filtering means electrically coupled to the photodetector for detecting the modulation component of the combined radiation in the electrical output of the photodetector.

According to one embodiment of the invention, the first and second distinct modulating signals are periodic signals having fundamental periods $T_1$ and $T_2$ respectively, wherein $T_1$ differs from $T_2$, and the filtering means comprise first and second electrical filters for detecting the first and the second modulating signals respectively in the photodetector output, and for providing first and second values indicative of amplitudes thereof to the control circuitry; the control circuitry includes comparison means for comparing the first and second values and for generating an error signal, and one of a PI controller, a PID controller and an I controller for generating a control signal from the error signal, and for providing the control signal to at least one of the first and second optical emitters for controlling the output power ratio thereof.

According to another embodiment of the invention, the first modulating signal $f_1(v \cdot t)$ and the second modulating signal $f_2(v \cdot t)$ are periodical signals having a same fundamental frequency $v$ and satisfying a relationship $f_2(v \cdot t) + \alpha \cdot f_1(v \cdot t) = 0$, wherein $\alpha$ is a pre-determined positive parameter, and the filtering means comprise an electrical filter for detecting a modulation signal at the frequency $v_1$, and for providing an error signal indicative of an amplitude thereof to the control circuitry.

Another feature of the present invention provides a method of controlling a DoP of combined radiation from two emitters of at least partially polarized radiation, the method comprising the steps of: a) distinctively modulating the at least partially polarized radiation of a first of the two emitters with a first modulating signal, and a second of the two emitters with a second modulating signal; b) forming the combined radiation by combining the at least partially polarized radiation from the two emitters having their prevailing polarization components orthogonal to each other with a polarization-maintaining combiner; c) detecting a modulation characteristics of the combined radiation indicative of a relative strength therein of the first and second modulating signals; and, d) controlling an output power ratio of the two emitters in response to the detected modulation characteristics of the combined radiation for maintaining the DoP of the combined radiation at a pre-determined level.

The method of the present invention can be employed for controllably maintaining the DoP of optical pump radiation provided by Raman and EDFA pump modules comprising multiple pairs of pump laser diodes at a nearly-zero level.

BRIEF DESCRIPTION OF THE DRAWINGS

Exemplary embodiments of the invention will now be described in conjunction with the drawings in which.

DETAILED DESCRIPTION

Referring to the figures, exemplary embodiments of the invention will now be described in reference to a Raman amplified optical communication link and a pump-combining apparatus for optical pumping of the Raman amplifier. The exemplary embodiments are provided to illustrate aspects of the invention and should not be construed as limiting the scope of the invention.

Figure 1:
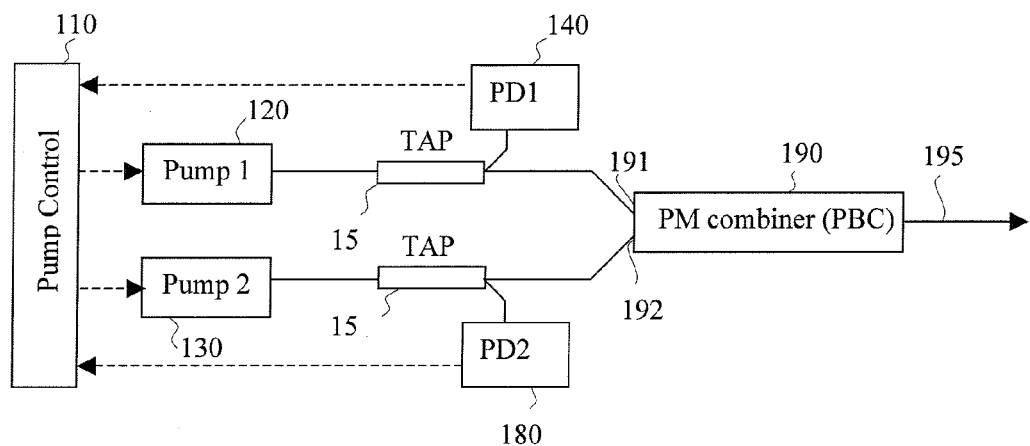
FIG. 1 is a diagram of a conventional pump laser module with polarization combining of radiation from two pump lasers and a pump laser control.
Figure 2:
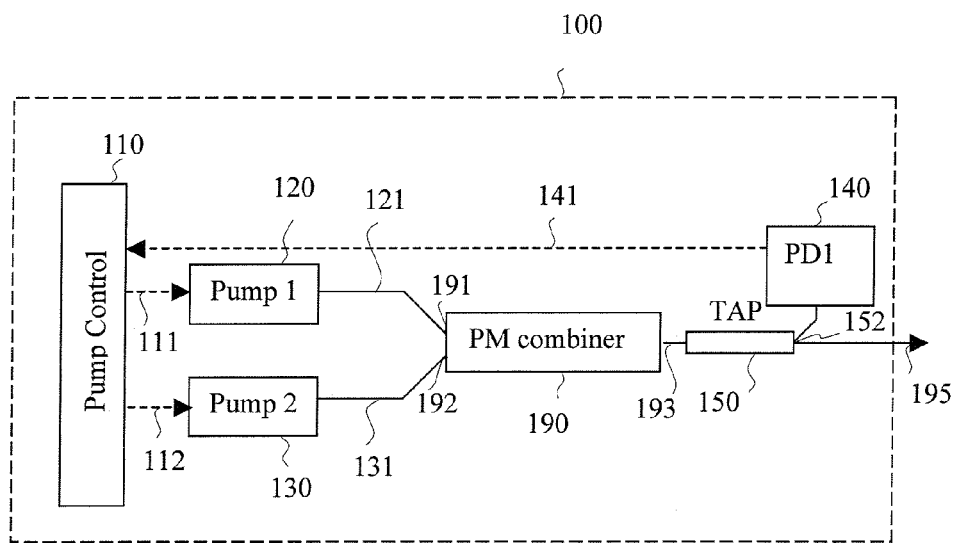
FIG. 2 is a diagram of a light emitting apparatus with polarization combining of radiation from two pump lasers and a controllable DoP according to the present invention.

FIG. 2 shows a laser apparatus 100 for emitting light with a controllable DoP according to a first exemplary embodiment of the present invention.

A first optical emitter 120 and a second optical emitter 130 are coupled to input waveguiding ports of the polarization-maintaining beam combiner 190 using polarization-maintaining (PM) fibers 121 and 131. The polarization-maintaining beam combiner 190 is embodied herein as a fiber-optic polarization beam combiner having two input PM fiber ports and an output fiber port; it is also referred to hereinafter as a polarization combiner or a PBC. An output fiber port of the PBC 190 is optically coupled to a photodetector 140 through an optical tap 150 having an input fiber port connected to an output PBC port by an optical fiber 193, and a tap port 152 optically coupled to an input fiber of the photodetector 140. An electrical output of the photodetector is connected to an electrical input of a pump controller 110, as indicated by an arrow 141. The pump controller 110 provides electrical control signals to the pump lasers 120 and 130, as indicated by arrows 111 and 112. The pump controller 110, the photodetector 140 and the optical tap 150 form optical emitter/DoP control means for controlling the output powers of the first and second emitters, and for controlling the DoP of the output radiation 195 of the laser apparatus 100 according to the present invention.

By way of example, the first and second optical emitters 120 and 130 are high-power diode lasers for emitting optical radiation centered at a first pump wavelength in the 1400 µm-1500 µm wavelength range; in other embodiments, lasers of other types emitting at least partially polarized radiation can be substituted as the first and second optical emitters 120 and 130 in place of the laser diodes. The first and second optical emitters 120 and 130 are also referred to hereinafter as pump laser diodes, or simply as pump lasers. Also by way of example, the optical tap 150 is preferably a non-polarization maintaining 1% optical fiber-based 1×2 tap coupler; and the photodetector 140 is a photodiode-based photodetector, which can include appropriate electrical circuitry, such as a trans-impedance amplifier, with a bandwidth sufficient for detecting modulation of the pump radiation as explained hereafter in this specification.

In operation, the laser pumps 120 and 130 emit at least partially polarized optical beams, also referred to hereinafter as the first and second light beams respectively, which are guided by the PM fibers 121 and 131 into the input ports of the PBC 190. The PM fibers 121 and 131 are oriented at the input ports of the PBC 190 so that the first and second light beams are combined therein with their prevailing polarization states orthogonal to each other, thereby forming a combined beam of light formed by combined radiation from the first and second optical emitters. The optical tap 150 separates out a small portion of the combined radiation, about 1% in this exemplary embodiment, and couples it into the photodetector 140, while passing most of the combined radiation therethrough to form a combined output beam represented by an arrow 195, which is also referred to hereinafter as a pump beam.

Since the first and second light beams are mutually incoherent, the combined beam of light guided into the input port of the optical tap 150 is largely depolarized, with most of its optical power divided between two orthogonal polarizations. The DoP of the combined output beam 195 satisfies the following equation (1):

$$D_c = |\eta_1 \cdot P_1 \cdot D_1 - \eta_2 \cdot P_2 \cdot D_2|/(\eta_1 \cdot P_1 + \eta_2 \cdot P_2) = \frac{\left|1 - \frac{\eta_2 P_2}{\eta_1 P_1} \frac{D_2}{D_1}\right|}{1 + \frac{\eta_2 P_2}{\eta_1 P_1}} \quad (1)$$

$P_1$ and $P_2$ in equation (1) are the output powers of the first and second pumps 120, 130 respectively, $D_c$ is the DoP of the combined beam of light at the output port of the optical tap 150, $D_1$ and $D_2$ are the DoPs of the first and second light beams at the output of the respective optical emitters 120 and 130. Coefficients $\eta_1 < 1$ and $\eta_2 < 1$ account for polarization-dependent optical loss (PDL) experienced by the optical radiation from the light emitters 120 and 130 respectively on their way to the optical tap 150 and therethrough; these coefficients will be referred to hereinafter as PDL coefficients. For the optical pumping of Raman amplifiers, it is typically required that the DoP of the combined beam of light is maintained at a substantially zero level, i.e. $D_c=0$.

As equation (1) illustrates, the DoP of the output beam 195 depends on a ratio $$\chi = \frac{\eta_2 P_2}{\eta_1 P_1}$$

of optical powers of the first and second emitters that pass through the optical tap 150. Changing environmental conditions, laser aging, and possibly other effects can cause variations of the pump powers $P_{1,2}$ and/or the PDL coefficients $\eta_{1,2}$, thereby leading to variations in the DoP of the combined radiation. In order to maintain the DoP of the combined optical beam 195 at a target value, relative variations in the optical powers $\eta_1 \cdot P_1$, $\eta_2 \cdot P_2$ from the first and second optical emitters contributing to the combined optical beam 195 have to be monitored and adjusted during operation.

The optical tap 150, the photodetector 140 and the pump controller 110, which together are referred to herein as optical emitter/DoP control means, function to monitor deviations of the ratio $\chi$ from a set point $\chi_{target}$ corresponding to a desired target DoP of the combined radiation, and to adjust an output power ratio $P_2/P_1$ so to maintain the DoP of the combined beam 195 sufficiently close to the target value. For this purpose, the pump controller 110 according to the method of the present invention distinctively modulates the first and second pump lasers 120 and 130 with a first and second distinct modulating signals respectively, while the photodetector 140, together with the optical tap 150 and the pump controller 110, operate to detect a modulation characteristics of the combined beam associated with the first and second modulating signals and indicative of a relative contribution thereof into the combined beam. Since the modulation component of the combined beam experiences same polarization transformation as a cw component thereof, the relative contribution of the first and second modulating signals is indicative of the ratio $\chi$ that affects the DoP of the combined beam.

In accordance with the method of the present invention, the first and second modulating signals are arbitrary time-dependent signals, either analogue or digital, that can be individually extracted from a linear combination thereof by signal processing, for example using appropriate digital or analogue filtering means capable of performing correlation or spectral analysis. In a preferred embodiment described herein the distinct modulating signals are periodic, which enables their detection in the photodetector output using commonly available electrical filters.

We will denote the first and second distinctive modulating signals as $f_1(v_1 \cdot t) = c_1 \cdot f'_1(v_1 \cdot t)$ and $f_2(v_2 \cdot t) = c_2 \cdot f'_2(v_2 \cdot t)$ respectively, where normalized functions $f'_1(v_1 \cdot t)$ and $f'_2(v_2 \cdot t)$ vary between +1 and −1 and have zero time averages, $<f'_1(v_1 \cdot t)>_t = <f'_2(v_2 \cdot t)>_t = 0$, and parameters $c_1$ and $c_2$ are modulation indexes defining modulation depths of the optical power of the first and second light beams respectively. With these notations, the time-dependent output powers $P_1(t)$ and $P_2(t)$ of the first and second emitters 120, 130 can be described by the following equations (2):

$$P_1(t) = P_1 \cdot [1 + c_1 \cdot f'_1(v_1 \cdot t)], \quad P_2(t) = P_2 \cdot [1 + c_2 \cdot f'_2(v_2 \cdot t)], \qquad (2)$$

wherein $P_1$ and $P_2$ are average output optical powers of the first and second optical emitters 120 and 130.

The optical power of the combined radiation includes a time-dependent modulation component m(t), which in turn includes contributions from both the first and second modulating signals as described by equation (3):

$$m(t) = \eta_1 \cdot P_1 \cdot c_1 \cdot f'_1(v_1 \cdot t) + \eta_2 \cdot P_2 \cdot c_2 \cdot f'_2(v_2 \cdot t) = \eta_1 \cdot P_1 \cdot [c_1 \cdot f'_1(v_1 \cdot t) + \chi \cdot c_2 \cdot f'_2(v_2 \cdot t)], \qquad (3)$$

The photodetector 140 converts the modulation signal m(t) into an electrical signal v(t), which is then communicated to the pump controller 110 as shown by the arrow 141. The pump controller 110 extracts from the electrical signal v(t) a modulation characteristic indicative of a relative contribution of the first and second modulating signals in the modulation component m(t) of the combined radiation and thereby indicative of the ratio $\chi$, generates an error signal proportional to a deviation of the ratio $\chi$ from its target value, and adjusts the emitter output power ratio $P_1/P_2$ in response to the generated error signal for maintaining the DoP of the combined radiation at its target value.

Various embodiments of the pump controller 110 realizing the DoP control method of the present invention with various modulating signals $f_1(v_1 \cdot t)$ and $f_2(v_2 \cdot t)$ can be implemented, depending on requirements of a particular application. The pump controller 110 itself can be digital, analogue or hybrid, i.e. using both analogue and digital parts. Two exemplary embodiments of the pump controller 110 realizing two different embodiments of the DoP control method of the present invention will now be described in sufficient detail so to enable their implementation by those skilled in the art.

Figure 3:
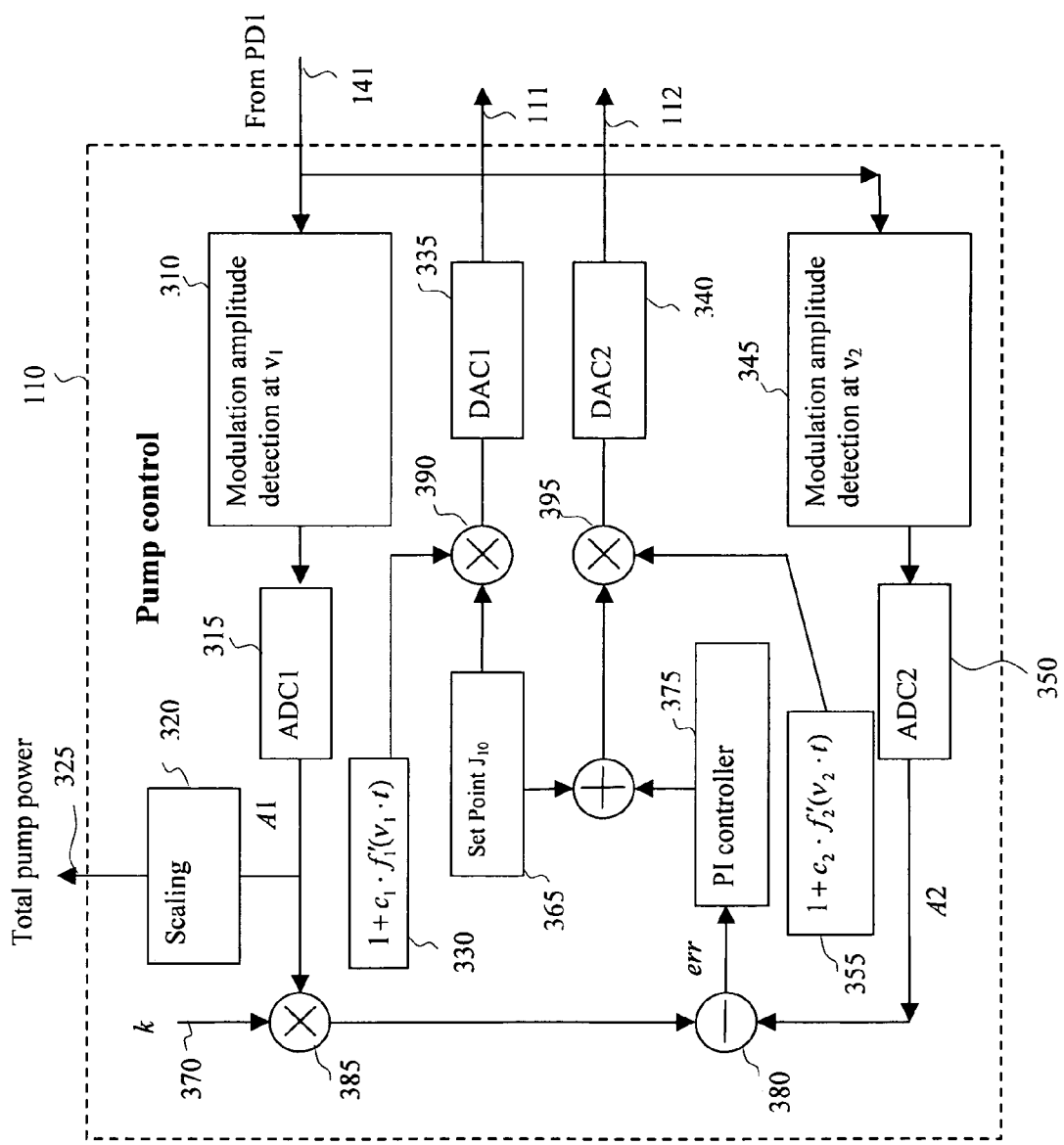
FIG. 3 is a diagram of a first embodiment of the pump control in the light emitting apparatus shown in FIG. 2 with pump modulation at two different frequencies.

With reference to FIG. 3, a first exemplary embodiment of the pump controller 110 according to the present invention employs periodic signals $f_1(v_1 \cdot t)$ and $f_2(v_2 \cdot t)$ having differing fundamental periods $T_1 = 1/v_1$ and $T_2 = 1/v_2$, wherein $T_1 < T_2$. In a frequency domain, these functions have peaks at frequencies $v_1$ and $v_2$ respectively, which are referred to hereinafter as the first and second modulation frequencies. In distributed Raman amplification systems, the modulation frequencies $v_1$, $v_2$ and the frequency difference $|v_1 - v_2|$ should be high enough to suppress modulation transfer from the pump radiation to signal radiation; for example, for Raman amplification in SMF fiber they preferably exceed 300 KHz for counter-propagating pumping geometry. The frequencies $v_1$ and $v_2$ should also be sufficiently far from harmonics of each other, so that spectra of the functions $f_1(v_1 \cdot t)$ and $f_2(v_2 \cdot t)$ do not overlap. The modulation indexes $c_1$ and $c_2$ are preferably less than 10% to further reduce the modulation transfer effects. By way of example, in the embodiment considered herein $v_1 = 1$ MHz, $v_2 = 1.3$ MHz, and the modulation indexes $c_1$ and $c_2$ are about 5%. The photodetector 140 has a bandwidth sufficient to detect signals at the first and second modulation frequencies.

The controller 110 is a hybrid, i.e. filtering and modulation amplitude extraction for each modulation frequency is performed using analogue filtering means which detect the modulation component v(t) and which are formed in this embodiment by electrical filters 345 and 310, while the rest of the signal processing is done in the digital domain using, e.g. an FPGA, a digital signal processor (DSP), or a combination thereof. Digital-to-analogue converters (DAC) 335, 340, and analogue-to-digital converters (ADC) 315, 350 are used to transfer signals from the digital to the analogue domain and back.

Figure 4:
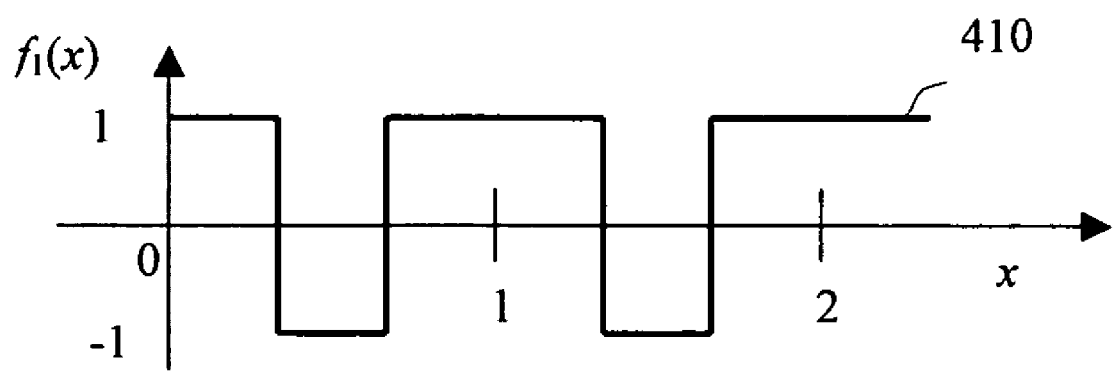
FIG. 4 is a graph exemplifying pump laser modulating signals used in the pump control module shown in FIG. 3.
Figure 4:
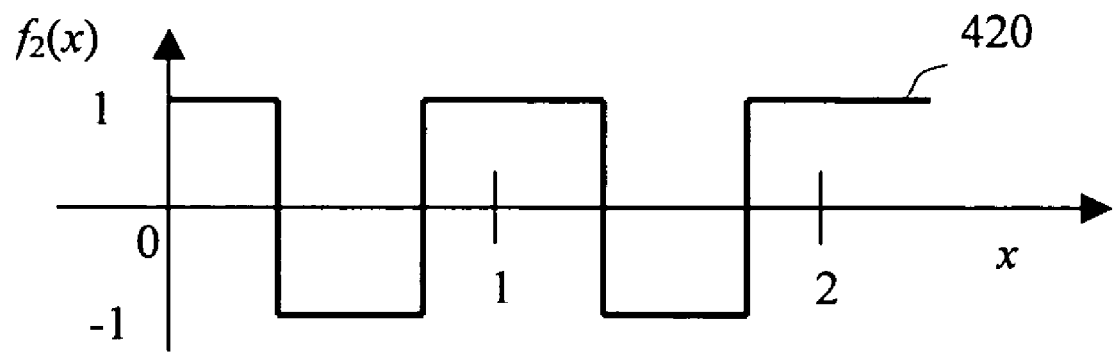

Due to computational limitations associated with digital FPGA-based processing, the first and second modulating signals are chosen to be digital binary signals, as illustrated in FIG. 4 with curves 410 and 420 by way of example. In another implementation, functions $f'_2(\chi)$ and $f'_1(\chi)$ defining modulating signals $f'_2(v_2 \cdot t)$ and $f'_1(v_1 t)$ can be chosen so that $f'_2(\chi) = f'_1(\chi) = f'(\chi)$.

Turning back to FIG. 3, the controller 110 has two output ports 111 and 112 for driving the first and second pump lasers 120 and 130, one input port 141 for receiving the electrical signal v(t) from the photodetector 140, and a monitoring port 325 for monitoring a total pump power, i.e. the optical power of the combined output beam 195.

In addition to the filters 310 and 345, which together with the photodetector 140 and the optical tap 150 form means for detecting the modulation component of the combined radiation in this embodiment of the invention, the pump controller 110 includes modulating means for modulating the output powers of the first and second optical emitters with the first and second distinct modulating signals, and a control circuitry. The modulating means are formed in this embodiment by function-generating FPGA blocks 330 and 355, multiplying units 390 and 395, and DACs 335 and 340. The function-generating unit 330 generates a time-dependent digital signals $[1 + f_1(v_1 \cdot t)] = [1 + c_1 \cdot f'_1(v_1 \cdot t)]$ which is then scaled by the multiplier 390 with a pre-determined drive current coefficient $J_{10}$ stored in the set point storing unit 365. Similarly, the function-generating unit 355 generates another time-dependent digital signal $[1 + f_2(v_2 \cdot t)] = [1 + c_2 \cdot f'_2(v_2 \cdot t)]$ which is scaled by a controlled parameter $J_{20}$, which is a sum of the pre-determined cw current coefficient $J_{10}$ and an output of a PI controller 375. Resulting digital signals are sent to the respective DAC units 335 and 340 to form two analogue time-dependent signals $J_1(t) = J_{10} \cdot [1 + c_1 \cdot f'_1(v_1 \cdot t)]$ and $J_2(t) = J_{20} \cdot [1 + c_2 \cdot f'_2(v_2 \cdot t)]$, which are then outputted through the output ports 111 and 112 for driving pump lasers 120 and 130 so that their output power is modulated as per equations (2).

The filtering means 310 and 345 of the pump controller 110 are electrically coupled to the photodetector 140 through the input port 141 for detecting the first and second modulating signals in the photodetector output. The first and second electrical filters 310 and 345 have pass-bands centered respectively at the frequencies $v_1$ and $v_2$. The first and second electrical filters 310 and 345 provide a first value $\alpha_1$ and a second value $\alpha_2$, respectively, to a control circuitry of the pump controller, which is formed in this embodiment by a PI controller 375, a comparison means 380 embodied as an FPGA subtraction circuit, and a scaling means 385 embodied as a multiplication circuit. The first and second values $\alpha_1$, $\alpha_2$ are proportional to amplitudes of spectral components of the photodetector output at the frequencies $v_1$ and $v_2$ respectively and are therefore indicative of a relative contribution of the first and second modulating signals in the combined beam.

The first value $a_1$ is digitized by the ADC 315, multiplied by a predetermined scaling factor k 370 using the multiplication circuit 385, and passed onto the subtraction circuit 380, where it is compared with the digitized second value $a_2$ forming an error signal $e = k \cdot a_1 - a_2$. The error signal is then fed into a proportional—integral (PI) controller 375 for generating a control signal. The control signal is added to the set point determining the cw component $J_{20}$ of the drive current of the second pump laser, thereby affecting the output power ratio of the first and second optical emitters. The PI controller 375 can be substituted with a proportional-integral-differential (PID) controller or an integral (I) controller, or with another appropriate controller as known to those skilled in the art, but preferably other than a simple proportional (P) controller.

In operation, the control circuitry of the pump controller 110 adjusts the power ratio $P_2/P_1$ so that a ratio of the first and second values outputted from the filters 310, 345 is maintained substantially equal to the scaling factor k, i.e. $\alpha_2/\alpha_1 = k$, thereby maintaining the DoP of the combined output beam 195 near a pre-determined DoP set point. The scaling coefficient k is thus a calibration parameter determining the DoP set-point of the laser apparatus 100; its value for a particular target DoP $D_c$ of the combined radiation can be determined by a calibration procedure which is performed either at a manufacturing stage of the laser apparatus after it is assembled or, preferably, after the installation thereof in an optical system as described hereinafter with reference to FIG. 6.

By way of example, the calibration procedure can include adjusting the scaling coefficient k and the drive current set point coefficient $J_{10}$ determining the cw components of the laser pump driving currents, while simultaneously monitoring the total output power and the DoP of the combined output beam 195 until the target DoP $D_c$ is reached, and the power ratio of the output powers of the first and second pump lasers satisfies equation (4):

$$\frac{P_2}{P_1} = \frac{\eta_1}{\eta_2} \frac{1-D_c}{D_2/D_1+D_c} \tag{4}$$

If the laser apparatus is used for optical pumping of a Raman amplifier, the target DoP is zero, which corresponds to a condition on a ratio of the output powers $P_1$ and $P_2$ of the first and second pumps 120, 130 described by equation (5):

$$\frac{P_2}{P_1} = \frac{\eta_1}{\eta_2} \frac{D_1}{D_2} \tag{5}$$

After the calibration, the scaling factor k and the set point values $J_{10}$, $J_{20}$ are stored in the pump controller.

Alternatively, the calibration procedure can include adjusting the power ratio $P_2/P_1$ until the output DoP is within a pre-determined tolerance interval containing a target value, e.g. less than 1%, and determining the ratio $\alpha_2/\alpha_1$ from the outputs of the ADC units 350 and 315.

Once the power ratio $P_2/P_1$ is set for obtaining the target DoP, the total optical power $P_t = (\eta_1 \cdot P_1 + \eta_2 \cdot P_2)$ of the combined beam 195 can be determined by appropriately scaling the output of the ADC unit 315, i.e. by scaling the first value $\alpha_1$ with another scaling coefficient obtained during the calibration procedure; this is accomplished in the pump controller 110 shown in FIG. 3 by a scaling unit 320 which outputs the total output power value of the laser apparatus through the power monitoring port 325.

Figure 5:
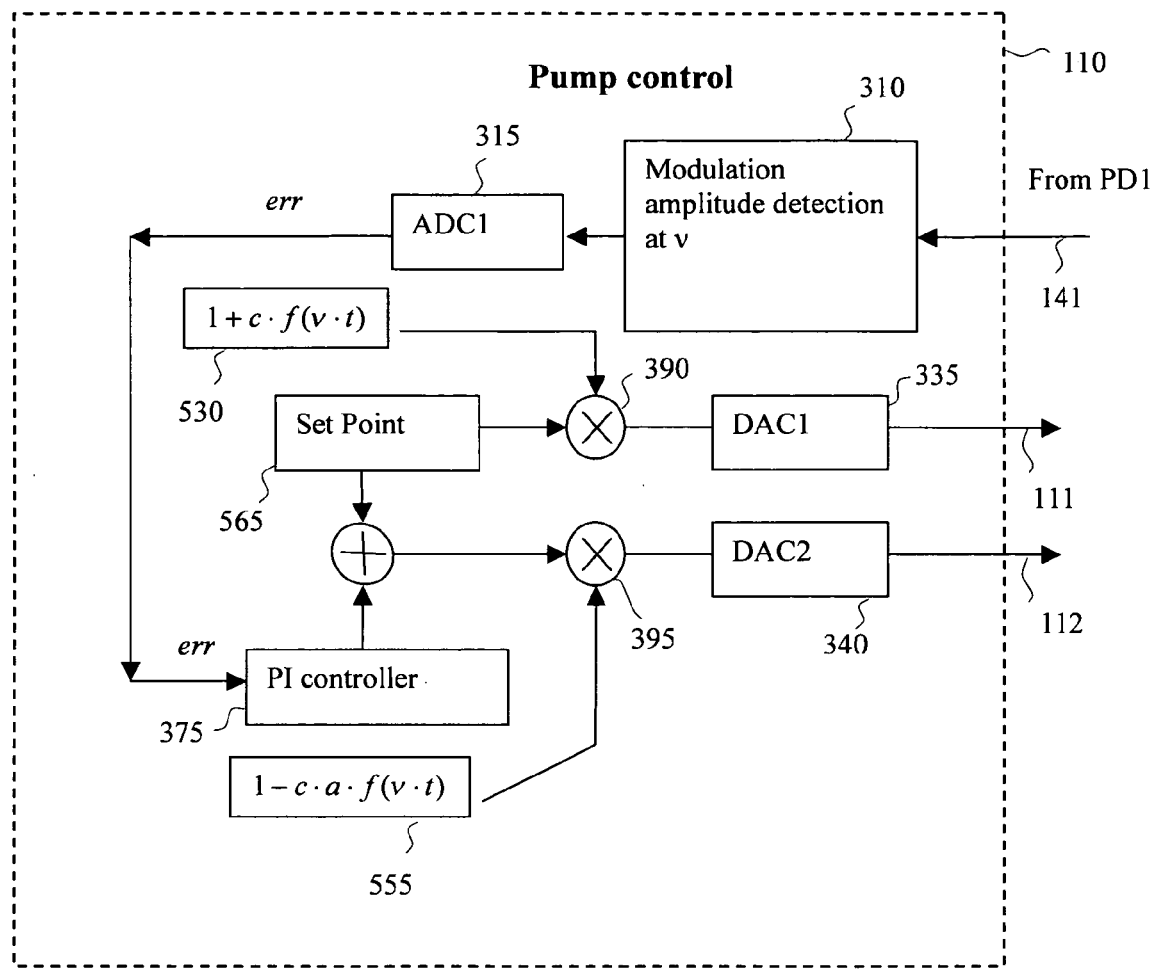
FIG. 5 is a diagram of a second embodiment of the pump control module shown in FIG. 2 employing counter-phase pump modulation; and, FIG. 6 is a diagram of a light emitting apparatus with polarization combining of radiation from two pairs of lasers and a controllable DoP according to the present invention.

In the aforedescribed first embodiment of the pump controller 110, the first and second distinctive modulating signals have different fundamental frequencies $v_1 \neq v_2$, requiring two filters and means to compare their outputs. FIG. 5 shows a second exemplary embodiment of the pump controller 110, wherein the two distinctive periodical signals have the same frequency $v_1 = v_2 = v$ but are shifted in time with respect to each other by half a period, so that the output powers of the first and second emitters are modulated in counter-phase, and their contributions to the combined radiation cancel each other at least partially. More particularly, the first and second distinctive signals $f_1(v \cdot t)$ and $f_2(v \cdot t)$ in this exemplary embodiment satisfy the following equation (6):

$$f_2(v \cdot t) = -\alpha \cdot f_1(v \cdot t) = f(v \cdot t), \tag{6}$$

wherein $\alpha$ is a positive parameter which is explain hereinafter. By choosing the modulation indexes of the output powers of the first and second emitters to substantially eliminate the modulation of the portion of the combined radiation coupled to the photodetector 140 when the DoP of the output beam 195 is equal to its target value, an amplitude of modulation of the combined radiation at the frequency $v$ can itself be used as the error signal for the DoP control scheme of the present invention.

The pump controller 110 in the embodiment shown in FIG. 5 is therefore a simplified version of the pump controller shown in FIG. 3. Since both modulating signals have now the same frequency, the filter/modulation amplitude detection unit 345 and the corresponding ADC unit 350 shown in FIG. 3 are redundant, as well as the subtraction unit 380 and the multiplication unit 385.

With reference to FIG. 5, the optical emitter modulating means in this embodiment of the pump controller 110 include two function generating units 530 and 555, the set point storing unit 565, the multipliers 390 and 395 and the DCA units 335 and 340, which in operation modulate the drive currents of the first and seconds laser pumps with the first and second modulating signals satisfying equation (6). The corresponding modulation indexes $c_1$ and $c_2$ are related to each other through a pre-determined positive parameter $\alpha$, so that $c_2 = \alpha \cdot c$, $c_1 = c$. As a result, the output powers of the first and second laser pumps change with time according to the following equations:

$$P_1(t) = P_1 \cdot [1 + c \cdot f'(\nu_1 \cdot t)], \quad P_2(t) = P_2 \cdot [1 - \alpha \cdot c \cdot f'(\nu_1 \cdot t)]. \quad (7)$$

The modulation component m(t) of the combined beam of light 195 is then determined by equation (8):

$$m(t) = \eta_1 \cdot P_1 \cdot c \cdot f'(\nu_1 \cdot t) - \eta_2 \cdot P_2 \cdot \alpha \cdot c \cdot f'(\nu_1 \cdot t) = \eta_1 \cdot P_1 \cdot c \cdot (1 - \chi \cdot \alpha) \cdot f'(\nu_1 \cdot t), \quad (8)$$

The scaling parameter α is determined during the calibration of the laser apparatus; by way of example, a corresponding calibration procedure includes bringing the laser apparatus in operation, adjusting the optical power ratio $P_1/P_2$ so that the DoP of the output beam 195 has its target value $D_c$, and then adjusting one or both of the modulation indexes $c_1$ and $c_2$ so to minimize v(t) as detected by the pump controller 110; if the target DoP is zero, the calibration yields $\alpha = 1/\chi_{target}$, where $$\chi_{target} = \frac{\eta_2 P_2}{\eta_1 P_1} \text{ for } D_c = 0.$$

In operation, the modulation component m(t) of the combined radiation is detected using modulation detecting means formed in this embodiment by the optical tap 150, the photodetector 140 and a single electrical analogue filter 310. The electrical filter 310 outputs a signal proportional to the amplitude of the modulation component m(t), which serves as the error signal and, after being digitized by the ADC 315, is passed directly to the PI controller 375 for controlling the set point of the cw drive current of the second pump laser 130.

Advantageously, this embodiment enables the simplification of the pump controller. Further, the modulation of the combined radiation is suppressed in this embodiment, which is advantageous for reducing detrimental effects of the modulation transfer in the amplifier.

Figure 6:
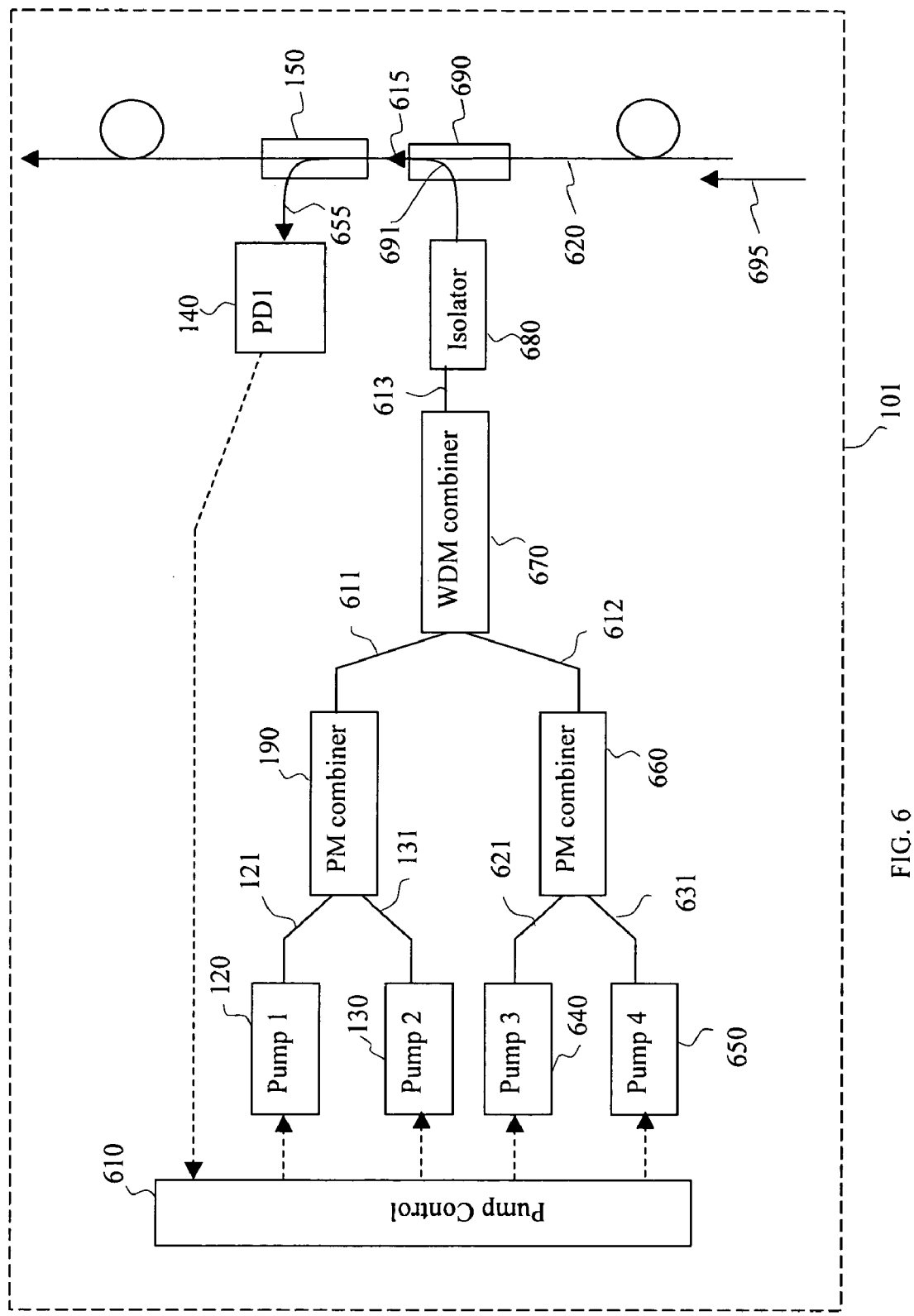

The method of the DoP control of the present invention can be extended onto laser systems, such as pump laser modules for waveguide, e.g. fiber, Raman amplifiers, which combine radiation from multiple pairs of pump lasers for inducing Raman gain in waveguides. In these laser systems each pair of pump lasers provides pump radiation preferably centered at a different wavelength, thereby enabling reduction of a spectral ripple of the Raman gain. FIG. 6 shows an example of a four-laser pump module with DoP control features according to the present invention arranged as a part of a Raman amplifier.

The pump laser apparatus 101 shown in FIG. 6 includes, in addition to the first and second pump laser diodes 120 and 130 coupled to the PBC 190, third and fourth optical emitters embodied as pump lasers 640 and 650, and a second PBC 660. Similar to the pump laser diodes 120 and 130, the pump laser diodes 640 and 650 each emit at least partially polarized light beam having a prevailing polarization component; these light beams, which will be referred to hereinafter as the third and fourth light beams respectively, are guided by PM fibers 621 and 631 into respective input ports of the PBC 660 in such a way that the fourth and third light beams are combined therein with their prevailing polarization components being mutually orthogonal, similarly as it is described hereinbefore with reference to FIG. 3 with respect to the pump lasers 120 and 130 and the PBC 190.

In the embodiment shown in FIG. 6, the pump radiation of the first and second pump lasers 120 and 130 is centered at the first pump wavelength, while the pump radiation of the third and fourth pump lasers 640 and 650 is centered at a second pump wavelength different from the first pump wavelength. Output ports of the first PBC 190 and the second PBC 660 are optically coupled into respective input ports of a WDM combiner 670 using optical waveguides 611 and 612 which can be non-polarization maintaining optical fibers such as SMF28. The PBC 190, the PBC 660 and the WDM combiner 670 together form beam combining means for combining at least partially polarized optical radiation of the four emitters in a combined beam of light having a substantially reduced DoP.

In operation, the WDM combiner 670 outputs the combined beam of light, also referred hereinafter as a pump beam, through an optical fiber port 613. The combined beam of light is then coupled into an optical fiber 620 using a WDM combiner 690, and induces therein a Raman gain for a WDM optical signal, which co-propagates in the optical fiber 620 with the pump beam as schematically illustrated by an arrow 695 showing the direction of the WDM signal propagation. Those skilled in the art would appreciate that the laser apparatus shown in FIG. 6 can be used also for Raman pumping of a counter-propagating WDM signal, i.e. a WDM signal propagating in the optical fiber 620 in a direction opposite to the direction of the arrow 695 and thus opposite to the direction 615 of pump beam propagation.

The optical fiber 620 can be either a transmission fiber such as SMF28 or LEAF forming a part of an optical communications link, or a dispersion-compensating fiber combining dispersion compensating with optical amplification properties when optically pumped with the pump radiation. In other embodiments, the optical fiber 620 can be doped by erbium or other appropriate elements, for providing optical gain therein in response to optical pumping by the pump radiation.

An optical tap 150 is disposed after the WDM coupler 690 and downstream therefrom with regard to the direction of propagation of the combined pump beam as shown by the arrow 691, for separating out a small portion, e.g. 1%, of the combined pump radiation, and for coupling thereof into the photodetector 140 as illustrated by an arrow 655. The photodetector 140 converts optical radiation coupled therein into an output electrical signal, which is then coupled into a pump controller 610.

In the co-propagating pump-signal arrangement shown in FIG. 6, the optical tap 150 will also couple a small portion of the WDM optical signal into the photodetector 140. By way of example, the optical tap 150 can be embodied as a directional 1×2 fiber-optic tap coupler, or as a 1×2 WDM fiber-optic beam splitter which suppresses coupling of the WDM optical signal into the photodetector 140.

Additional optical elements can be inserted in the optical path between the WDM combiner 670 and the WDM coupler 690 for performing various optical functions according to a particular system design; by way of example, FIG. 6 shows an optical isolator 680 inserted therein for preventing optical back-reflections into the laser pumps.

Similar to the aforedescribed embodiments, the optical tap 150, the photodetector 140 and the pump controller 610 form emitter/DoP control means for controlling, in this embodiment—for minimizing, the DOP of the combined beam of light, by:

i) distinctively modulating the radiation of the four emitters 120, 130, 640 and 650 with first, second, third, and fourth distinctive modulating signals respectively, ii) detecting a first modulation characteristic of the combined radiation indicative of a relative strength therein of the first and second modulating signals, and a second modulation characteristic of the combined radiation indicative of a relative strength therein of the third and fourth modulating signals, and iii) individually controlling an output power ratio of the first and second emitters in response to the first detected modulation characteristic, and an output power ratio of the third and fourth emitters in response to the second detected modulation characteristic of the combined radiation.

In one embodiment, the pump controller 610 combines two pump controllers described hereinbefore with reference to FIG. 3 for individually controlling the output power ratio of the first and second optical emitters, and the output power ratio of the third and fourth optical emitters. Accordingly, the pump controller 610 modulates the four optical emitters with periodical signals at four different modulation frequencies $v_1$, $v_2$, $v_3$ and $v_4$, and then detects the first, second, third and fourth distinct modulating signals respectively in the output signal of the photodetector 140 using four electrical filters with pass-bands centered at the respective modulation frequencies $v_1$, $v_2$, $v_3$ and $v_4$, thereby providing four values indicative of amplitudes of the four distinct modulating signals to the control circuitry for individually controlling the output power ratio of the first and second optical emitters, and the output power ratio of the third and fourth optical emitters. This embodiment also enables individual monitoring of the total pump power at the first pump wavelength and the total pump power at the second pump wavelength by appropriate scaling of values provided by two of the four electrical filters.

In another embodiment, the pump controller 610 combines two pump controllers, each as described hereinbefore with reference to FIG. 5. In this embodiment, the first modulating signal $f_1(v_1 \cdot t)$ and the second modulating signal $f_2(v_1 \cdot t)$ form a counter-phase pair of periodical signals having a fundamental frequency $v_1$ and satisfying a relationship $f_2(v_1 \cdot t) + \alpha_1 \cdot f_1(v_1 \cdot t) = 0$, wherein $\alpha_1$ is a pre-determined parameter; similarly, the third modulating signal $f_3(v_3 \cdot t)$ and the fourth modulating signal $f_4(v_3 \cdot t)$ form another counter-phase pair of periodical signals having another fundamental frequency $v_3 \ne v_1$ and satisfying a relationship $f_4(v_3 \cdot t) + \alpha_2 \cdot f_3(v_3 \cdot t) = 0$. The modulation component m(t) of the combined radiation includes then two sub-components having fundamental frequencies $v_1$ and $v_3$ respectively.

Accordingly, the pump controller 610 in this embodiment has filtering means including a first electrical filter for detecting the modulation sub-component at the frequency $v_1$ in the photodetector output, and a second electrical filter for detecting the modulation sub-component at the frequency $v_3$. The first and second electrical filters provide two error signals indicative of amplitudes of the modulation sub-components at the frequencies $v_3$ and $v_1$ to respective control circuitries described hereinbefore, for controlling the output power ratio of the first and second optical emitters and the output power ratio of the third and fourth optical emitters.

Parameter $\alpha_1$ defines the modulation depth of the first optical emitter relative to the second optical emitter, while parameter $\alpha_2$ defines the modulation depth of the third optical emitter relative to the fourth optical emitter. The values $\alpha_1$ and $\alpha_2$ are determined during a calibration procedure from a condition that the error signals are minimized when the combined beam of light coupled into the optical fiber 620 has a substantially zero DoP, and are stored in the pump controller.

Note that disposing the optical tap 150 as the last optical element in the fiber pumping arrangement, i.e. after the optical isolator 680 and the WDM coupler 690 advantageously, enables the polarization dependent loss of these optical components to be compensated for during the calibration procedure.

In other embodiments, the pump laser module with DoP control according to the present invention can include additional pump lasers which radiation is distinctively modulated and combined pair-wise with their respective polarization combiners and added to the combined pump beam using e.g. additional or the same WDM combiner, or even single pump lasers emitting non-polarized or polarized radiation. The single pump lasers can be distinctively modulated by a controller, and the same photodetector 140 can be used to detect a corresponding modulation amplitude in the combined radiation for monitoring of the optical power of the single laser without interfering with the DoP control feature of the present invention. In some embodiments, one of the first and second optical emitters 120, 130 can itself include two optical emitters modulated with distinct modulating signals and a polarization combiner.

We note also that while the apparatus and method for emitting light with a controllable DoP according to the present invention is discussed herein with respect to optical pumping of Raman fiber amplifiers wherein the DoP is controlled at a low enough level, the invention may be implemented in conjunction with other optical amplifiers, including erbium-doped waveguide amplifiers, and in conjunction with other radiation-emitting systems wherein a DoP control of the emitted radiation at an arbitrary pre-determined level between 1 and 0 is desired.

Of course numerous other embodiments may be envisioned without departing from the spirit and scope of the invention.

We claim:

1. A light emitting apparatus for emitting light with a controllable degree of polarization (DoP), comprising:
   a first optical emitter for emitting a first at least partially polarized light beam having a prevailing polarization component;
   a second optical emitter for emitting a second at least partially polarized light beam having a prevailing polarization component;
   a beam combining means for combining the first and second light beams into a combined beam of light wherein the prevailing polarization components of the first and second beams of light are mutually orthogonal; and,
   a DoP control means comprising:
      modulating means for modulating output powers of the first and second optical emitters with first and second distinct modulating signals, respectively;
      detecting means disposed to receive at least a portion of the combined beam of light for detecting a modulation component thereof related to the first and second distinct modulating signals; and,
      control circuitry coupled to the detecting means for maintaining a target DoP of the combined radiation by controlling an average output power of at least one of the first and second optical emitters in dependence upon the detected modulation component of the combined beam of light so as to maintain a ratio of the first and second distinct modulating signals in the combined beam of light at a pre-determined value corresponding to the target DOP.

2. A light emitting apparatus as defined in claim 1, wherein the detecting means comprise:

an optical tap for separating out a portion of the combined beam of light;

a photodetector optically coupled to the optical tap for converting the portion of the combined beam of light into an electrical output; and, filtering means electrically coupled to the photodetector for detecting the modulation component of the combined radiation in the electrical output of the photodetector.

3. A light emitting apparatus as defined in claim 2, wherein:

the first and second distinct modulating signals are periodic signals having fundamental periods $T_1$ and $T_2$ respectively, wherein $T_1$ differs from $T_2$; and the filtering means comprises first and second electrical filters for detecting the first and the second modulating signals, respectively, in the photodetector output, and for providing first and second values indicative of amplitudes thereof to the control circuitry.

4. A light emitting apparatus as defined in claim 3, wherein the control circuitry comprises:

a comparison means for comparing the first and second values and for generating an error signal; and, one of a PI controller, a PID controller and an I controller for generating a control signal from the error signal, and for providing the control signal to at least one of the first and second optical emitters for controlling the output power ratio thereof.

5. A light emitting apparatus as defined in claim 4, wherein the comparison means includes means for scaling one of the first and second values with a pre-determined scaling factor dependent on a target DoP of the combined beam of light.

6. A light emitting apparatus as defined in claim 5, wherein the pre-determined scaling factor is determined during a calibration procedure and accounts for at least one of:

unequal degrees of polarization of the first and second light beams, unequal modulation depths of the first and second light beams, and unequal optical loss of the prevailing polarization components of the first and second optical beams.

7. A light emitting apparatus as defined in claim 3, wherein the control circuitry further comprises scaling means for determining a total output power of the first and second emitters from one of the first and second values.

8. A light emitting apparatus as defined in claim 2, wherein the pre-determined value of the ratio of the first and second distinct modulating signals in the combined beam of light is set for minimizing the DoP of the combined beam of light.

9. A light emitting apparatus as defined in claim 8 for use as one of a Raman amplifier pump module or an EDFA pump module.

10. A light emitting apparatus as defined in claim 1 wherein the first and second optical emitters comprise pump laser diodes.

11. A light emitting apparatus as defined in claim 2, wherein:

the first modulating signal $f_1(v \cdot t)$ and the second modulating signal $f_2(v \cdot t)$ are periodical signals having a same fundamental frequency $v$ and satisfying a relationship $f_2(v \cdot t) + \alpha \cdot f_1(v \cdot t) = 0$, wherein $\alpha$ is a pre-determined positive parameter; and, the filtering means comprises an electrical filter for detecting a modulation signal at the fundamental frequency $v$, and for providing an error signal based on an amplitude thereof to the control circuitry for minimizing said amplitude.

12. A light emitting apparatus as defined in claim 11, wherein the control circuitry comprises one of a PI controller, a PID controller and an I controller for generating a control signal from the error signal and for providing the control signal to at least one of the first and second optical emitters for controlling the output power ratio thereof.

13. A light emitting apparatus as defined in claim 11, wherein the pre-determined parameter $\alpha$ depends on a target DoP of the combined beam of light and accounts for at least one of:

unequal degrees of polarization of the first and second light beams, unequal modulation depths of the first and second light beams, and unequal optical loss of the prevailing polarization components of the first and second optical beams.

14. A light emitting apparatus as defined in claim 11, wherein the control means are adapted for minimizing the DOP of the combined beam of light.

15. A method of controlling a DOP of combined radiation from two emitters of at least partially polarized radiation, the method comprising the steps of:

a) distinctively modulating the at least partially polarized radiation of a first of the two emitters with a first modulating signal, and a second of the two emitters with a second modulating signal;

b) forming the combined radiation by combining the at least partially polarized radiation from the two emitters having their prevailing polarization components orthogonal to each other with a polarization-maintaining combiner;

c) detecting a modulation characteristics of the combined radiation, and generating a difference value indicative of a relative strength of the first modulating signal compared to the second modulating signals in the combined radiation; and, d) maintaining the DoP of the combined radiation at a pre-determined level by utilizing the difference value to automatically adjust an output power ratio of the two emitters.

16. A method according to claim 15, wherein step a) comprises:

modulating the first of the two emitters with a first periodical signal at a first frequency $v_1$ with a first modulation index $c_1$; and modulating the second of the two emitters with a second periodical signal at a second frequency $v_2$ different from $v_1$ with a second modulation index $c_2$.

17. A method according to claim 16, wherein step (c) comprises:

detecting modulation components of the combined radiation corresponding to the first and second modulating signals and obtaining first and second values related to amplitudes thereof;

generating the difference value from the first and second values and a pre-determined scaling factor; and, adjusting an average output power of at least one of the two emitters when the difference value deviates from a pre-determined set point.

18. A method according to claim 15, wherein step (a) comprises:

modulating the first of the two emitters with a first periodical signal $f_1(v_1 \cdot t)$ at a modulation frequency $v_1$ with a first modulation index $c_1$; and, modulating the second of the two emitters with a second periodical signal $f_2(v_1 \cdot t)$ at the modulation frequency $v_1$ with a second modulation index $c_2$, wherein the second periodical signal $f_2(v_1 \cdot t)$ satisfies a relationship $f_2(v_1 \cdot t) + \alpha \cdot f_1(v_1 \cdot t) = 0$, wherein a is α pre-determined positive parameter.

19. A method according to claim 18, wherein step (c) comprises:
measuring an amplitude of a modulation component of the combined radiation at the frequency $v_1$;
forming a control signal from the measured amplitude of said modulation component using one of a PI controller, a PID controller and an I controller; and,
adjusting an average output power of at least one of the two emitters in response to the control signal so as to minimize the measured amplitude of said modulation component of the combined radiation.

20. An apparatus according to claim 8 further comprising:
a third optical emitter for emitting a third at least partially polarized light beam having a prevailing polarization component, and a fourth optical emitter for emitting a fourth at least partially polarized light beam having a prevailing polarization component;
wherein the beam combining means are for combining the third and fourth light beams into the combined beam of light wherein the prevailing polarization components of the third and fourth light beams are mutually orthogonal;
wherein the modulating means are for modulating output powers of the third and fourth optical emitters with third and fourth distinct modulating signals, respectively;
wherein the modulation component of the combined beam of light comprises a modulation sub-component associated with the third and fourth modulating signals; and,
wherein the control circuitry is for controlling an average output power of at least one of the third and fourth emitters in response to the detected modulation sub-component of the combined beam of light; and,
wherein the emitter control means are for controlling the DOP of the combined beam of light by affecting an output power ratio of the third and fourth emitters in dependence on the detected modulation sub-component of the combined beam of light.

21. An apparatus according to claim 20, wherein:
the first and the second at least partially polarized light beams are formed by optical radiation having optical spectra centered at a first wavelength;
the third and the fourth at least partially polarized light beams are formed by optical radiation having optical spectra centered at a second wavelength; and,
the beam combining means comprise:

a first polarization combiner having two input ports and an output port, wherein a first of the two input ports is optically coupled to the first optical emitter, and a second of the two input ports is optically coupled to the second optical emitter;
a second polarization combiner having two input ports and an output port, wherein a first of the two input ports is optically coupled to the third optical emitter, and a second of the two input ports is optically coupled to the fourth optical emitter; and,
a WDM combiner having two input ports optically coupled to the output ports of the first and second polarization combiners, and an output port for outputting the combined beam of light.

22. An apparatus according to claim 20, wherein:
the first, second, third and fourth distinct modulating signals are periodic signals having different fundamental frequencies; and,
wherein the filtering means comprise four electrical filters for detecting the first, second, third and fourth distinct modulating signals respectively in the photodetector output, and for providing four values indicative of amplitudes thereof to the control circuitry for individually controlling the output power ratio of the first and second optical emitters, and the output power ratio of the third and fourth optical emitters.

23. A light emitting apparatus as defined in claim 20, wherein:
the first modulating signal $f_1(v_1 \cdot t)$ and the second modulating signal $f_2(v_1 \cdot t)$ are periodical signals having a same fundamental frequency $v_1$ and satisfying a relationship $f_2(v_1 \cdot t) + \alpha_1 \cdot f_1(v_1 \cdot t) = 0$, wherein $\alpha_1$ is a pre-determined parameter;
the third modulating signal $f_3(v_3 \cdot t)$ and the fourth modulating signal $f_4(v_3 \cdot t)$ are periodical signals having a same fundamental frequency $v_3$ and satisfying a relationship $f_4(v_3 \cdot t) + \alpha_2 \cdot f_3(v_3 \cdot t) = 0$, wherein $\alpha_2$ is a pre-determined parameter and wherein $v_3$ differs from $v_1$; and,
the filtering means comprises:
a first electrical filter for detecting a modulation signal at the frequency $v_1$, and for providing an error signal indicative of an amplitude thereof to the control circuitry for controlling the output power ratio of the first and second optical emitters; and,
a second electrical filter for detecting a modulation signal at the frequency $v_3$, and for providing an error signal indicative of an amplitude thereof to the control circuitry for controlling the output power ratio of the third and fourth optical emitters.

* * * * *